United States Patent [19]

Hsu

[11] Patent Number: 5,171,496
[45] Date of Patent: Dec. 15, 1992

[54] PROCESS FOR MAKING WOOD COMPOSITE EMPLOYING BLAST-FURNACE SLAG AS THE BINDER

[75] Inventor: Wu-Hsiung E. Hsu, Orleans, Canada
[73] Assignee: Forintek Canada Corp., Ottawa, Canada
[21] Appl. No.: 584,024
[22] Filed: Sep. 18, 1990
[51] Int. Cl.$^5$ ............................................. C04B 40/00
[52] U.S. Cl. ........................................ 264/82; 264/83
[58] Field of Search ................... 264/82, 83, 101, 109, 264/122

[56] References Cited

U.S. PATENT DOCUMENTS

| | | | |
|---|---|---|---|
| 3,468,993 | 9/1969 | Bierlich | 264/82 |
| 3,492,385 | 1/1970 | Simunic | 264/82 |
| 4,060,580 | 11/1977 | Pampel | 264/109 |
| 4,121,942 | 10/1978 | Kato | 264/82 |
| 4,350,567 | 9/1982 | Moorehead et al. | 264/82 |
| 4,362,679 | 12/1982 | Malinowski | 264/82 |
| 4,427,610 | 1/1984 | Murray | 264/82 |
| 4,436,498 | 3/1984 | Murray | 425/73 |
| 4,708,918 | 11/1987 | Forss | 428/453 |
| 4,746,481 | 5/1988 | Schmidt | 264/82 |
| 4,927,573 | 5/1990 | Alpár et al. | 264/40.1 |

Primary Examiner—Mary Lynn Theisen
Attorney, Agent, or Firm—Trevor C. Klotz

[57] ABSTRACT

A novel method of making a wood composite employing cellulosic material as the wood component and pulverized blast-furnace slag as the binder component and the product produced thereby is disclosed. A settable mixture of the wood component, binder component and water is prepared and thereafter subjected to a forming pressure within a confined space. While in its confined condition, the mixture is also subjected to heat and carbon dioxide ($CO_2$) for a time and at a temperature sufficient to cause accelerated and early setting of the mixture. Optionally, calcium-rich compounds can be added to the settable mixture as a slag cement binder enhancer and sodium silicate can also be used as a mineralizer. The cellulosic material can also be pre-treated with a fire retardant resulting in a cementatious wood composite exhibiting improved fire resistance and in situ fire load bearing strength. Slag cement is plentiful, being a by-product of steel mills, but as a binder, is significantly less expensive than Portland cement. Employing $CO_2$ injection, comparable set times for slag and Portland cements can be obtained, but the wood composite employing a slag cement binder has superior final strength.

23 Claims, No Drawings

PROCESS FOR MAKING WOOD COMPOSITE EMPLOYING BLAST-FURNACE SLAG AS THE BINDER

BACKGROUND OF INVENTION

Wood composites such as boards and panels fabricated from a cellulosic material and a cementatious product as the binder are known in the art and are considered desirable in the construction trades since they generally exhibit, in comparison to conventional resin bonded wood panels or boards such as particleboard, improved fire, decay, termite and weathering resistance, and also in comparison to conventional concrete, are of lower density and enjoy a lower thermal conductivity.

Unlike common concrete with rigid aggregates, wood composites employing a cement based binder cannot maintain their shape and dimension after a forming pressure is relieved due to "springback", unless considerable strength in the cement has first been developed.

As wood is an organic material and cement inorganic, they are inherently incompatible, and will not normally bond together unless additional bonding techniques are employed, such as the mineralization of wood and the neutralizing of sugars and other extractives in the wood, or maintaining the compressed cement-wood product in this state for an unacceptable long period of time. As a result, the procedures involved in producing cement-bonded wood composites is significantly different from those used when making concrete products or resin bonded wood products.

Although cement bonded wood composite is, in many respects superior to resin bonded wood products, such as particleboard, the former has, hitherto, only enjoyed limited success in North America which may be attributable to the fact that the fabrication of cement bonded wood composites is not conducive to mass production, as the set and cure rates of the cement is slow, and large plant inventories and associated equipment are necessary to permit the boards or panels to mature to full strength.

Historically, Portland cement was first employed as a cementacious binder for the cellulosic material, with various proposals being advanced in order to expedite the production of this type of product.

Carbon dioxide ($CO_2$) has long been recognized as a means of accelerating the initial cure of Portland cement by carbonation. For example, K. G. Bierlich, in U.S. Pat. No. 3,468,993 issued Sep. 23, 1969, in context of conventional concrete utilizing Portland cement and solid aggregate, disclosed subjecting this mixture with water to pressure compaction, and during the early stage of hydration and gel formation, exposing the compressed mixture to an atmosphere of carbon dioxide at superatmospheric pressure in order to obtain early strength.

In U.S. Pat. No. 4,746,481 issued May 24, 1988—Schmidt, also having recognized that $CO_2$ accelerates significantly the carbonization of Portland cement, developed a method of producing a wood based composite bonded with this type of cement. According to this process, using a carbon dioxide injection press, $CO_2$, through unheated press platens, is injected into a compressed mat of wood material, Portland cement and water, to achieve early strength in the board or panel being produced. No consideration, however, was given to the adverse effect sugar and other wood extractives can have on Portland cement bonding, as discussed below.

Realizing that Portland cement and the amount of cement required in the production of cement bonded wood composites is high, as is its overall production costs, others have attempted to use pulverized water quenched blast-furnace cement, which is also known as latent hydraulic cement or slag cement, as a binder for the fiberous material. Although slow to mature, slag cement exhibits a greater final strength than Portland cement.

Forss in U.S. Pat. No. 4,708,918 issued Nov. 24, 1987 noted that while wood sugars or other extractives in the wood has a deleterious effect on Portland cement as a binder, a pulverized slag cement, as a binder, on the other hand, appears insensitive or immune to these wood sugars and extractives. Accordingly, Forss discloses combining pulverized slag cement (pulverized slag is not hydraulic on its own, in the sense it cannot set in the presence of water alone for a reasonable time period) with an activator having an alkaline reaction and water glass. Since large quantities of activator are used, slag cement-bonded wood composites produced by this prior art technique do develop considerable initial strength in the press, and enables the pressed product to be removed from the press without post-press clamping during the early stage of curing in order to avoid springback. However, this technique still requires an excessive press time (e.g. over 10-15 minutes for a 12 mm thick board), with the press time required dramatically increasing with increasing board thickness. Further, because significant quantities of activator are required, the cost component of the activator is high relative to the remaining raw materials. It has also been observed that the finished products do not display great dimensional stability, and are subject to water staining due to the high alkaline content.

Accordingly, until the present invention, pulverized blast-furnace cement, also known as slag cement, while having inherent material cost saving attributes, has not been effectively employed in the production of wood composites where early strength or set up of the slag binder in a press is a desired object, and which is a prerequisite to using slag cement as a binder in the production of wood composites on a mass production, high output basis.

Wood is the least expensive raw material used in a cementatious wood composite and within limits, its strength increases with increasing wood content. Conversely, however, as the wood content increases, the fire, decay and termite resistance capability of the composite decreases due to the fact that more wood may be exposed for combustion and other adverse environments. Thus, and in keeping with another aspect of this invention, a cementatious wood product can be produced which exhibits greater resistance to fire than its counterparts heretofore produced, and additionally, following a fire, should have greater in situ fire load carrying strength.

SUMMARY OF INVENTION

In accordance with this invention, the known attributes of cellulosic composites employing a cementatious binder are retained, and since a pulverized blast-furnace slag is employed as the binder, a significant raw material cost saving is realized over Portland cement.

Additionally, activators and mineralizers may not be required in the production of the wood composite of this invention. Finally, when using slag cement as the binder in accordance with the process of this invention, far shorter press times are required to achieve an early set of this binder when compared to the known technique of using activators for the slag binder.

In accordance with one method of this invention, the wood composite is produced by firstly preparing a settable mixture of selected proportions of pre-sized cellulosic material, pulverized blast-furnace slag and water. The cellulosic material, as a wood component, can include, for example, wood chips, wood fibres, sawdust and the like. As indicated above, the binder component is a pulverized blast-furnace slag and is readily obtainable as a by-product in granular form from steel mills.

The settable mixture is compressed in a confined space into a desired configuration, such as an untrimmed panel or board, and while in this compressed and confined condition, is subjected to heat and carbon dioxide ($CO_2$) for a time and at a temperature sufficient to cause early setting of the mixture. Thereafter, the set mixture is recovered and stored or stacked for curing (if necessary), and cutting and trimming.

In the production of panels or boards, it is preferred to compress and confine the settable mixture in mat form to a target thickness in a sealable injection press as is known in the art, and which are normally employed to cure resin bonded particleboard and the like by means of steam injection of the compressed mat.

Employing a sealable injection press, the settable mixture can be subjected to heat by heating the press platens, or, injecting the compressed and confined mixture with steam or hot air. Further, and in order to initiate carbonation of the pulverized slag, $CO_2$ can be similarly injected using the same known injection techniques applicable to steam pressing resin bonded wood components. If desired, the $CO_2$ can also be pre-heated for the purpose of heating the compressed mat.

In order to obtain enhanced penetration of the compressed settable mixture by $CO_2$ gas injected into it, the confined and sealed space can also be subjected to a vacuum prior to or during the injection of $CO_2$ and if desired, this injection treatment can be repeated several times.

When producing panels in accordance with this invention, the ratio of the wood component to binder component can range from 1 to 4 parts by weight, and preferably is from 2 to 3. The ratio of water to binder, on the other hand, can be from 0.2 to 0.6 parts by weight, with the preferred ratio being from 0.3 to 0.5 parts by weight. $CO_2$ pressure injection, on the other hand, can range from 80 to 120 psi.

The set time of the binder while the settable mixture is in its compressed and confined condition can vary from 2 to 10 minutes and as above-noted, is a function of the time required for carbonation of the slag cement and hence also a function of the target thickness of the object being pressed. The time required for minimum carbonation required can be measured by monitoring the heat increase of the settable mixture undergoing $CO_2$ injection, up to the point that its heat of carbonation falls off, which when employing the $CO_2$ pressure parameters as outlined above, has been found to be from 2 to 3 minutes for five eighth inches ($\frac{5}{8}$") thickness panels.

The heat applied to the settable mixture which has been found necessary to assist in advancing the carbonation, can range from 40° C. to 130° C. and preferably, is in the range of 80° C. to 100° C. The application of heat and the injection of $CO_2$ preferably take place concurrently, but injection can follow the heat application. Thus, while the $CO_2$ injection time may be relatively short, the overall press or set time for the wood composite being produced can vary any where from 2 to 10 minutes.

Once set, the recovered set mixture in its formed condition can be stored from 2 to 7 days in order to achieve final curing or maturing.

The ratio of calcium oxide (CaO) to silicon dioxide ($SiO_2$) is approximately from 0.75 to 1.0 for slag cement, whereas this ratio for ordinary Portland cement is about 3.0 to 3.25. Although not essential when practising this invention in its broadest aspect, it is obviously desirable to deal with this calcium oxide deficiency that exist in slag cement. Accordingly, in order to overcome it, and in accordance with another preferred embodiment of this invention, a calcium-rich compound or compounds can be added to the slag cement as an inorganic binder enhancer, and advantageously, can be added to the slag when undergoing pulverization. Typical calcium-rich compounds suitable for this purpose are calcium oxide, calcium hydroxide, calcium chloride, and anhydrite, with the preferred weight percent range for the anhydrite to the slag cement being from 10% to 20%, and for the remainder of the above listed calcium compounds being from about 2% to 10%.

Similarly, while the addition of sodium silicate to the settable mixture is not regarded as essential, its inclusion is preferred as it has been found to enhance the wood-slag cement bond, functioning as a wood mineralizer or coupling agent. When used, its content need not be great, and need not exceed 2% by weight of the slag cement in the binder component.

It was indicated earlier that in accordance with yet another aspect of this invention, the fire resistance capability and hence the in situ fire load strength of panels or the like produced in accordance with this invention can exhibit improved fire resistance and in situ fire load-carrying strength over existing equivalent cementatious wood composites. This is readily achieved by treating the wood component with a fire retardant compound such as borate or boric acid, or a combination of the two, which is also a fungicide and an insecticide, prior to preparing the settable mixture. Treatment is preferably by spraying the wood component, with the percentage of the fire retardant compound absorbed by the wood being from 7% to 10% by weight of the wood calculated on a dry wood basis. It should be noted that while surface treatment of resin based wood composites is known, it is only possible to treat these types of products with borate or boric acid after the resin has set (i.e. after the wood-resin composite has been pressed and set) and as a result there is no assurance the fire retardant has penetrated into the interior of the wood-resin composite. Because the wood component is fully exposed to fire retardant additive prior to its mixing, compression and setting with the cementatious material, improved fire resistance is imparted to the final product even though its wood component may be relatively high, and as a result, the product also displays a higher structural load bearing strength in in situ fire situations when compared with equivalent products that have not been so treated with a fire retardant. When the foregoing types of fire retardants are employed, however, in order to maximize the fire resistance capabilities of the finished product by way of fully encapsulating or surrounding individual wood pieces or particles with cementatious binder, the ratio of wood to slag is preferably from 1 to 2.5 by weight. It, of course, is also possible to produce the fire retardant wood composite product such as a panel or beam in a way whereby the ratio of wood to cement is higher in center or core for strength while its outer area or surface has a lower wood to cement ratio, to thereby render it more fire resistant and additionally, to produce a smoother exterior surface.

In the following examples, three different wood composite panels were produced in accordance with this invention, all using pulverized blast furnace slag (slag cement) as the binder.

EXAMPLE 1

Using pine/spruce/fir shavings of approximately number 14 mesh as the wood component, the shavings were mixed with pulverized slag cement and sodium silicate as the binder component and water in the following ratios by weight:
slag cement/wood = 2.75/1
water/slag cement = 0.4/1
sodium silicate/slag cement = 0.02/1 (at 35% conc)

The foregoing settable mixture was then formed into a mat and the mat then placed on a press platen of a sealable injection press. The press was then closed and sealed with the mat undergoing a target compressed mat thickness of five eighths inches ($\frac{5}{8}''$). In its compressed and confined condition, the compressed mat was exposed to a temperature of 90° C. by means of heated press platens, and was injected with a $CO_2$ gas at a pressure of 100 psi for 4 minutes. The pressure in the press was then released and the resultant board, having a density of 88 pounds/ft$^3$, recovered.

EXAMPLE 2

A second board was prepared, formed and pressed as in Example 1, except that it was pressed at normal room temperature.

EXAMPLE 3

A third board was prepared, formed and pressed as in Example 1, but in this case, 2.5% by weight $CaCl_2$ as a binder enhancer was mixed with the slag cement to form the binder component in the settable mixture.

The results of panels produced in accordance with the above three Examples are summarized in Table 1:

TABLE 1

| Example | Cement Type | Press Temperature °C. | Max Temp | Max Time to Reach Maximum Temp. sec. | I.B. Strength, psi After 36 hours |
|---|---|---|---|---|---|
| 1 | slag cement | 90° | 115° C. | 90–100 | 38 |
| 2 | slag cement | 30° | 78° C. | 210 | 17 |
| 3 | slag cement | 90° | 119° C. | 90–100 | 50 |

The "Max Temp" was the highest temperature measured for each of the three panels when undergoing carbonation as a result of $CO_2$ injection. The time to reach this maximum temperature, specified in seconds, was measured from the time $CO_2$ injection commenced to the point where the temperature of the compressed mat was observed to fall off. "I.B. Strength" is a measurement of the internal board strength, expressed in pounds per square inch, and was taken at 36 hours after recovery of each panel from the press.

From Table 1, the specimen prepared in accordance with Example 1 and which was pressed at an elevated temperature took less press time to achieve carbonation as determined by the temperature of the board undergoing $CO_2$ injection, when compared to the equivalent board of Example 2 pressed at room temperature. It was also observed that the panel subjected to heat (Example 1) during compression, displayed a higher internal bond strength after 36 hours than the panel of Example 2 which was compressed at 30° C.

When employing $CaCl_2$ as a binder enhancer (Example 3), while its rate of carbonation was no different from that of Example 1 not containing $CaCl_2$ in the settable mixture, its internal bond strength after 36 hours was improved over the Example 1 specimen, and significantly improved over the panel of Example 2.

From the foregoing, a settable mixture of cellulosic material, slag cement and water, when subjected to compression, heat and $CO_2$ injection produces a set wood composite which, when released from the press is readily handled and transportable. Being a slag cement bonded wood composite, its ultimate final board strength is superior to that obtainable with Portland cement, and also appears not to be affected by wood sugars or other extractives which is a drawback when using Portland cement as a binder with certain woods. Where the cellulosic material was pre-treated with a fire retardant prior to preparing the settable mixture, the presence of the fire retardant was not observed as having any adverse effect on the rate of carbonization or the internal board strength of the panel.

I claim:

1. A method of making a wood composite, comprising the steps of:
   (a) preparing a settable mixture of selected proportions of pre-sized cellulosic material as a wood component, pulverized blast-furnace slag as a binder component, and water;
   (b) compressing said mixture into a desired configuration in a sealed injection press;
   (c) subjecting said mixture while in said sealed injection press to heat and $CO_2$ injected at a pressure from 80 to 120 p.s.i. for a time and at a temperature sufficient to set said mixture; and
   (d) recovering the set mixture.

2. The method as claimed in claim 1, wherein the binder component includes a binder enhancer selected from the group consisting of at least one of calcium oxide, calcium hydroxide, calcium chloride and anhydrite.

3. The method as claimed in claim 1, wherein said mixture is subjected to heat by means of at least one of heated press platens, steam injection, hot air injection and hot $CO_2$ injection.

4. The method as claimed in claim 3, wherein said mixture in said sealed injection press is subjected to a vacuum at least once during the injection of said settable mixture with $CO_2$.

5. The method as claimed in claim 1, wherein the mixture is injected with $CO_2$ from 2 to 5 minutes.

6. The method as claimed in claim 2, wherein the ratio of wood component to binder component is from 1 to 4 parts by weight.

7. The method as claimed in claim 6, wherein the ratio of wood component to binder component is from 2 to 3 parts by weight.

8. The method as claimed in claim 2, wherein the ratio of water to binder component is from 0.2 to 0.6 parts by weight.

9. The method as claimed in claim 8, wherein the ratio of water to binder component is from 0.3 to 0.5 parts by weight.

10. The method as claimed in claim 2, wherein the ratio of the binder enhancer comprising at least one of calcium oxide, calcium hydroxide and calcium chloride to said slag is from 2% to 10% by weight.

11. The method as claimed in claim 2, wherein the ratio of anhydrite as the binder enhancer to said slag is from 10% to 20% by weight.

12. The method as claimed in claim 1, wherein said binder component also includes sodium silicate.

13. The method as claimed in claim 2, wherein said binder component also includes sodium silicate in an amount no greater than 2% by weight of said slag.

14. The method as claimed in claim 2, wherein the heat applied to said settable mixture is from 40° C. to 130° C.

15. The method as claimed in claim 14, wherein the heat applied to said settable mixture is from 80° C. to 100° C.

16. The method as claimed in claim 2, wherein the set time of said mixture is from 2 to 10 minutes.

17. The method as claimed in claim 16, wherein the cure time of the recovered set mixture is from 2 to 7 days.

18. The method as claimed in claim 1, wherein the pre-sized cellulosic material is treated with a fire retardant prior to preparing said settable mixture, said fire retardant being selected from the group consisting of at least one of borate and boric acid.

19. The method as claimed in claim 2, wherein the pre-sized cellulosic material is treated with a fire retardant prior to preparing said settable mixture, said fire retardant being selected from the group consisting of at least one of borate and boric acid and wherein the ratio of said fire retardant to said cellulosic material on a dry weight basis is from 7% to 10%.

20. A method of making a wood composite, comprising the steps of:
  (a) preparing a settable mixture of cellulosic material as a wood component, pulverized blast-furnace slag as a binder component, and water, and wherein the ratio of wood component to binder component is from 1 to 4 by weight and the ratio of water to binder component is from 0.2 to 0.6 by weight;
  (b) compressing a mat of said settable mixture in a sealable injection press;
  (c) applying heat to the compressed mat at a temperature from 40° C. to 130° C. and injecting the compressed mat with $CO_2$ at a pressure from 80 to 120 psi while said sealable injection press is sealed for a time sufficient to set said mixture; and
  (d) recovering said set mixture from said press.

21. The method as claimed in claim 20, wherein said binder component includes a binder enhancer selected from the group consisting of at least one of calcium oxide, calcium hydroxide and calcium chloride in a ratio of 2% to 10% by weight of said slag and anhydrite in a ratio of 10% to 20% by weight of said slag and sodium silicate as a mineralizer in an amount not more than 2% by weight of said slag, and wherein the ratio of said wood component to said binder component is from 2 to 3 by weight, the ratio of water to said binder component is from 0.3 to 0.5 by weight, said temperature is from 80° C. to 100° C., and said $CO_2$ injection pressure is from 80 to 120 psi.

22. The method as claimed in claim 20, wherein the pre-sized cellulosic material is treated with a fire retardant prior to preparing said settable mixture, said fire retardant being selected from the group consisting of at least one of borate and boric acid.

23. The method as claimed in claim 21, wherein the ratio of said wood component to said slag component is from 1 to 2.5 by weight and wherein the pre-sized cellulosic material is treated with a fire retardant prior to preparing said settable mixture, said fire retardant being selected from the group consisting of at least one of borate and boric acid and wherein the ratio of said fire retardant to said cellulosic material on a dry weight basis is from 7% to 10%.

* * * * *